United States Patent
Zhou

(10) Patent No.: US 9,929,578 B2
(45) Date of Patent: Mar. 27, 2018

(54) CHARGING METHODS AND ELECTRONIC DEVICES

(71) Applicant: Lenovo (Beijing) Limited, Beijing (CN)

(72) Inventor: Zhiqiang Zhou, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 366 days.

(21) Appl. No.: 14/227,862

(22) Filed: Mar. 27, 2014

(65) Prior Publication Data

US 2015/0042290 A1 Feb. 12, 2015

(30) Foreign Application Priority Data

Aug. 12, 2013 (CN) .......................... 2013 1 0349794

(51) Int. Cl.
*H02J 7/00* (2006.01)
(52) U.S. Cl.
CPC .......... *H02J 7/0052* (2013.01); *H02J 7/0054* (2013.01)
(58) Field of Classification Search
CPC ..................................... Y02E 60/12
USPC ..................................... 320/137
See application file for complete search history.

(56) References Cited

U.S. PATENT DOCUMENTS

| 2008/0122400 | A1* | 5/2008 | Kubota | H02J 7/0004 320/106 |
|---|---|---|---|---|
| 2010/0207572 | A1* | 8/2010 | Kirby | H02J 7/025 320/101 |
| 2011/0018496 | A1* | 1/2011 | Kozakai | H02J 7/0042 320/108 |
| 2011/0121653 | A1* | 5/2011 | Hartular | H02J 1/10 307/66 |
| 2012/0126744 | A1* | 5/2012 | Kuroda | H01M 10/44 320/107 |
| 2013/0307475 | A1* | 11/2013 | Kishiyama | H02J 7/0027 320/109 |
| 2013/0314036 | A1* | 11/2013 | Nakagawa | H02J 5/005 320/108 |
| 2014/0312833 | A1* | 10/2014 | Won | H04B 5/0037 320/108 |
| 2016/0099757 | A1* | 4/2016 | Leabman | H04B 5/0037 307/104 |

FOREIGN PATENT DOCUMENTS

| CN | 101770261 A | 7/2010 |
|---|---|---|
| CN | 102508519 A | 6/2012 |
| WO | WO-2013053991 A1 | 4/2013 |

* cited by examiner

*Primary Examiner* — Suresh Memula
(74) *Attorney, Agent, or Firm* — Schwegman Lundberg & Woessner, P.A.

(57) ABSTRACT

Charging methods and electronic devices are provided. According to an embodiment, provided is a charging method for an electronic device having a plurality of operating modes. The method may comprise: detecting an operating mode of the electronic device; utilizing a first charging mode corresponding to a first operating mode to charge the electronic device when the first operating mode is detected; and utilizing a second charging mode corresponding to a second operating mode to charge the electronic device when the second operating mode is detected.

10 Claims, 8 Drawing Sheets

CHARGING METHODS AND ELECTRONIC DEVICES

RELATED APPLICATIONS

This application claims the benefit of priority under 35 U.S.C. Section 119, to Chinese Patent Application Serial No. 201310349794.8 filed on Aug. 12, 2013, which application is incorporated herein by reference in its entirety.

TECHNICAL FIELD

The present disclosure generally relates to the electronics field, and particularly, to charging methods and electronic devices.

BACKGROUND

As the electronic technology develops, there are more and more types of electronic devices and their functions are more and more powerful. These electronic devices cause great conveniences to our daily life.

At present, electronic devices which can be assembled with each other and/or detached from each other flexibly are more favorable to the people. For example, a display portion of a notebook computer can be taken out to be used separately as a tablet computer, and a mobile phone may be incorporated with a docking station having a display screen to be used as a notebook computer. Such electronic devices may be differently incorporated in difference applications and thus operate in different operating modes. For example, when a tablet is incorporated with a base in such a manner that a display side of the tablet computer faces a keyboard on the base, they are combined as a conventional notebook computer; and when they are incorporated with each other in such a manner that the display side of the tablet computer faces away from the keyboard on the base, they are combined as a tablet computer with a support structure.

However, the inventors found that there are some disadvantages.

When an electronic device having a plurality of operating modes is to be charged, the electronic device may be charged in a single charging strategy and the charging strategy cannot be adapted in real time to an actual operation mode of the electronic device.

For example, assume that a detachable notebook computer adopts a charging strategy to charge both a battery in its base and a battery in a tablet computer as a part thereof simultaneously. Then, the battery in the base and the battery in the tablet computer are charged simultaneously based on this charging strategy, whether the tablet computer and the base are combined to be a conventional notebook computer or to be a tablet computer with a support structure, without considering user's different requirements on charging for difference operating modes. For example, when they are combined to be a tablet computer with a support structure, the user may prefer to first charge the tablet computer because the user may take out the tablet computer for separate use at any moment; and when they are combined to be a conventional notebook computer, the user may prefer to first charge the battery in the base so as to ensure chips provided in the base to operate with high performances, and thus to ensure that a large scale console game played by the user runs stably and fluently.

Therefore, there is a need for automatically adapting the charging mode of the electronic device in real time to the actual operating mode of the electronic device.

SUMMARY

The present disclosure aims to provide, among others, charging methods and electronic devices, to meet the need for automatically adapting a charging mode of an electronic device in real time to an actual operating mode of the electronic device.

According to an aspect of the present disclosure, there is provided a charging method for an electronic device having a plurality of operating modes. The method may comprise: detecting an operating mode of the electronic device; utilizing a first charging mode corresponding to a first operating mode to charge the electronic device when the first operating mode is detected; and utilizing a second charging mode corresponding to a second operating mode to charge the electronic device when the second operating mode is detected.

Detecting an operating mode of the electronic device may comprise: detecting a connection mode of the electronic device; determining that the operating mode of the electronic device is the first operating mode when a first connection mode is detected; and determining that the operating mode of the electronic device is a second operating mode when the second connection mode is detected.

Detecting a connection mode of the electronic device may comprise: detecting first status information about proximity of a first surface of the electronic device to a second surface of the electronic device; determining that the connection mode of the electronic device is the first connection mode based on the first status information; detecting second status information about proximity of the first surface of the electronic device to a third surface of the electronic device; and determining that the connection mode of the electronic device is the second connection mode based on the second status information.

Utilizing a first charging mode corresponding to a first operating mode to charge the electronic device may comprise: determining a first energy storage unit of the electronic device to be the one with a higher charging priority based on the first operating mode; charging the first energy storage unit; and charging a second energy storage unit of the electronic device when it is detected that the first energy storage unit is in a full charge status.

Utilizing a second charging mode corresponding to a second operating mode to charge the electronic device may comprise: determining a second energy storage unit of the electronic device to be the one with a higher charging priority based on the second operating mode; charging the second energy storage unit; and charging a first energy storage unit of the electronic device when it is detected that the second energy storage unit is in a full charge status.

After determining that the second energy storage unit of the electronic device is the one with a higher charging priority, the method may further comprise: detecting third status information indicating that the second energy storage unit is in an uncharged status; and utilizing the first energy storage unit to charge the second energy storage unit based on the third status information.

According to another aspect of the present disclosure, there is provided a charging method for a first electronic device connectable to a second electronic device connected in at least two connection modes, the method comprising: detecting a connection mode between the first electronic device and the second electronic device; utilizing a first charging mode corresponding to a first connection mode to charge the first electronic device when the first connection mode is detected; and utilizing a second charging mode corresponding to a second connection mode to charge the first electronic device when the second connection mode is detected. The method may further comprise: detecting first status information about proximity of a first surface of the first electronic device to a second surface of the second electronic device; determining that the connection mode between the first electronic device and the second electronic device is the first connection mode based on the first status information.

The electronic device may comprise a first body and a second body, and detecting the connection mode of the electronic device may comprise: detecting first status information about proximity of a first surface of the first body to a second surface of the second body; determining that the connection mode of the electronic device is the first connection mode based on the first status information; detecting second status information about proximity of the first surface of the electronic device to a third surface of the second body; and determining that the connection mode of the electronic device is the second connection mode based on the second status information.

Utilizing a first charging mode corresponding to a first connection mode to charge the first electronic device may comprise: determining a first energy storage unit of the first electronic device to be the one with a higher charging priority based on the first connection mode; charging the first energy storage unit; and charging a second energy storage unit of the second electronic device when it is detected that the first energy storage unit is in a full charge status.

Utilizing a second charging mode corresponding to a second connection mode to charge the first electronic device may comprise: determining a second energy storage unit of the second electronic device to be the one with a higher charging priority based on the second connection mode; charging the second energy storage unit; and charging a first energy storage unit of the first electronic device when it is detected that the second energy storage unit is in a full charge status.

After determining that the second energy storage unit of the second electronic device is the one with a higher charging priority, the method may further comprise: detecting third status information indicating that the second energy storage unit is in an uncharged status; and utilizing the first energy storage unit to charge the second energy storage unit.

According to a further aspect of the present disclosure, there is provided an electronic device having a plurality of operating modes. The electronic device may comprise: a first detection unit configured to detect an operating mode of the electronic device; a first charging unit configured to utilize, based on a detected first operating mode, a first charging mode corresponding to the first operating mode to charge the electronic device; and a second charging unit configured to utilize, based on a detected second operating mode, a second charging mode corresponding to the second operating mode to charge the electronic device.

The first detection unit may comprise: a first detection module configured to detect a connection mode of the electronic device; and a first determination module configured to determine the operating mode of the electronic device based on the detected connection mode, wherein the first determination module is configured to determine that the operating mode of the electronic device is the first operating mode when the detected connection mode is a first connection mode, and to determine that the operating mode of the electronic device is the second operating mode when the detected connection mode is a second connection mode.

The electronic device may comprise a first body and a second body. The first detection module may comprise: a first detection submodule configured to detect first status information about proximity of a first surface of the first body to a second surface of the second body; a first determination submodule configured to determine that the connection mode of the electronic device is the first connection mode based on the first status information; a second detection submodule configured to detect second status information about proximity of the first surface to a third surface of the second body; and a second determination submodule configured to determine that the connection mode of the electronic device is the second connection mode based on the second status information.

The first charging unit may comprise: a second determination module configured to determine a first energy storage unit of the electronic device to be the one with a higher charging priority based on the first operating mode; a first charging module configured to charge the first energy storage unit when first energy storage unit is determined to be the one with a higher charging priority; a third detection module configured to detect first charge information indicating that the first energy storage unit is in a full charge status; and a second charging module configured to charge a second energy storage unit of the electronic device based on the first charge information.

The second charging unit may comprise: a third determination module configured to determine a second energy storage unit of the electronic device to be the one with a higher charging priority based on the second operating mode; a third charging module configured to charge the second energy storage unit when the second energy storage unit is determined to be the one with a higher charging priority; a fourth detection module configured to detecting second charge information indicating that the second energy storage unit is in a full charge status; and a fourth charging module configured to charge a first energy storage unit of the electronic device based on the second charge information.

The second charging unit may comprise: a fifth detection module configured to detect third status information indicating that the second energy storage unit is in an uncharged status when the second energy storage unit is determined to be the one with a higher charging priority; and a fifth charging module configured to charge the second energy storage unit by using the first energy storage unit based on the third status information.

According to a still further aspect of the present disclosure, there is provided an electronic device connectable to a second electronic device in at least two connection modes, the electronic device comprising: a first detection unit configured to detect a connection mode between the electronic device and the second electronic device; a first charging unit configured to utilize, based on a detected first connection mode, a first charging mode corresponding to the first connection mode to charge the electronic device; and a second charging unit configured to utilize, based on a detected second connection mode, a second charging mode corresponding to the second connection mode to charge the electronic device.

The first detection unit may comprise: a first detection module configured to detect first status information about proximity of a first surface of the electronic device to a second surface of the second electronic device; a first determination module configured to determine that the connection mode between the electronic device and the second electronic device is the first connection mode based on the first status information; a second detection module configured to detect second status information about proximity of the first surface of the electronic device to a third surface of the second electronic device; and a second determination module configured to determine that the connection mode between the electronic device and the second electronic device is the second connection mode based on the second status information.

The first charging unit may comprise: a third determination module configured to determine a first energy storage unit of the electronic device to be the one with a higher charging priority based on the first connection mode; a first charging module configured to charging the first energy storage unit when the first energy storage unit is determined to be the one with a higher charging priority; a third detection module configured to detect first charge information indicating that the first energy storage unit is in a full charge status; and a second charging module configured to charge a second energy storage unit of the second electronic device based on the first charge information.

The second charging unit may comprise: a fourth determination module configured to determine a second energy storage unit of the second electronic device to be the one with a higher charging priority based on the second connection mode; a third charging module configured to charge the second energy storage unit when the second energy storage unit is determined to be the one with a higher charging priority; a fourth detection module configured to detect second charge information indicating that the second energy storage unit is in a full charge status; and a fourth charging module configured to charge a first energy storage unit of the electronic device based on the second charge information.

The second charging unit may further comprise: a fifth detection module configured to detect third status information indicating that the second energy storage unit is in an uncharged status when the second energy storage unit is determined to be the one with a higher charging priority; and a fifth charging module configured to charge the second energy storage unit by using the first energy storage unit based on the third status information.

According to one or more embodiments of the present disclosure, there can be the following effects or advantages.

According to embodiments of the present disclosure, when an electronic device is to be charged, an operating mode of the electronic device is detected, and then a corresponding charging mode for the electronic device is determined according to the detected operating mode and the electronic device is charged in the charging mode. For example, assume an electronic device includes a tablet computer and a base. When the tablet computer and the base are combined in such a manner that a display side of the tablet computer faces a keyboard on the base, the electronic device is actually operated as a notebook computer, and a user may need to make inputs by using the keyboard to perform operations such as editing. Therefore, it is preferred to first charge the base so as to make the notebook computer stably operate. When the tablet computer and the base are combined in such a manner that the display side of the tablet computer faces away from the keyboard on the base, it is preferred to first charge the tablet computer so as to maintain its battery in a charge saturation state. As a result, the tablet computer is ready to be taken out by the user for separate use. Thus, it is possible to satisfy different requirements of the user on charging by selecting charging modes based on different operating modes, and thus to meet the need of automatically adapting the charging mode for the electronic device in real time to the actual operation mode of the electronic device.

According to further embodiments of the present disclosure, after the second energy storage unit of the electronic device is determined to be the one with a higher charging priority, whether the second energy storage unit is charged or not may be detected. When it is detected that the second energy storage unit is not charged, the first energy storage unit may be utilized to charge the second energy storage unit to ensure that the second energy storage unit is in a charge saturation status. Taking the detachable notebook as an example, when a power adapter is drawn out or turned off, it is detected that the second battery in the tablet computer is not charged and thus the second battery will be charged by the first battery in the base to ensure that the battery of the tablet computer is in a charge saturation status. As a result, when the user takes out the tablet computer for separate use, it is possible to keep the charge amount in the tablet computer as much as possible and thus to facilitate the user to use the tablet computer as long as possible.

DETAILED DESCRIPTION

Figure 1:
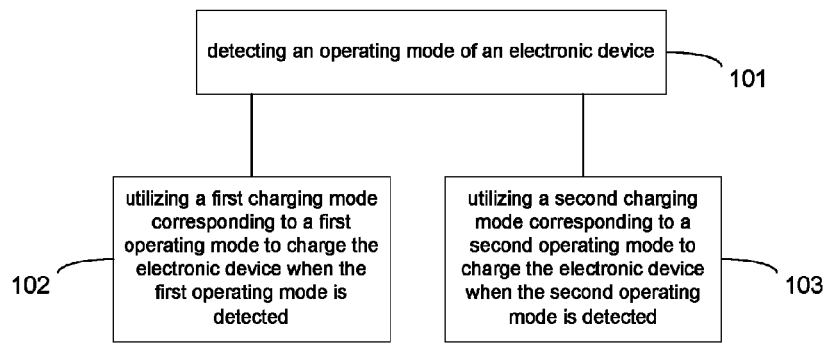
FIG. 1 is a flowchart schematically showing a charging method according to an embodiment of the present disclosure.

According to embodiments of the present disclosure, there are provided charging methods and electronic devices, to meet the need for automatically adapting a charging mode for an electronic device in real time to an actual operation mode of the electronic device.

According to an aspect of the present disclosure, there is provided a charging method for an electronic device having a plurality of operating modes. The method may comprise:

detecting an operating mode of the electronic device; utilizing a first charging mode corresponding to a first operating mode to charge the electronic device when the first operating mode is detected; and utilizing a second charging mode corresponding to a second operating mode to charge the electronic device when the second operating mode is detected.

According to another aspect of the present disclosure, there is provided a charging method for a first electronic device connectable to a second electronic device in at least two connection modes, the method comprising: detecting a connection mode between the first electronic device and the second electronic device; utilizing a first charging mode corresponding to a first connection mode to charge the first electronic device when the first connection mode is detected; utilizing a second charging mode corresponding to a second connection mode to charge the first electronic device when the second connection mode is detected.

According to a further aspect of the present disclosure, there is provided an electronic device having a plurality of operating modes. The electronic device may comprise: a first detection unit configured to detect an operating mode of the electronic device; a first charging unit configured to utilize, based on a detected first operating mode, a first charging mode corresponding to the first operating mode to charge the electronic device; and a second charging unit configured to utilize, based on a detected second operating mode, a second charging mode corresponding to the second operating mode to charge the electronic device.

According to a still further aspect of the present disclosure, there is provided an electronic device connectable to a second electronic device in at least two connection modes, the electronic device comprising: a first detection unit configured to detect a connection mode between the electronic device and the second electronic device; a first charging unit configured to utilize, based on a detected first connection mode, a first charging mode corresponding to the first connection mode to charge the electronic device; and a second charging unit configured to utilize, based on a detected second connection mode, a second charging mode corresponding to the second connection mode to charge the electronic device.

According to embodiments of the present disclosure, when an electronic device is to be charged, an operating mode of the electronic device is detected, and then a corresponding charging mode for the electronic device is determined according to the detected operating mode and the electronic device is charged in the charging mode. As a result, it is possible to meet the need of automatically adapting the charging mode for the electronic device in real time to the actual operation mode of the electronic device.

For example, assume an electronic device includes a tablet computer and a base. When the tablet computer and the base are combined in such a manner that a display side of the tablet computer faces a keyboard on the base, the electronic device is actually operated as a notebook computer, and a user may need to make inputs by using the keyboard to perform operations such as editing. Therefore, it is preferred to first charge the base so as to make the notebook computer stably operate. When the tablet computer and the base are combined in such a manner that the display side of the tablet computer faces away from the keyboard on the base, it is preferred to first charge the tablet computer so as to maintain its battery in a charge saturation state. As a result, the tablet computer is ready to be taken out by the user for separate use. Thus, it is possible to satisfy different requirements of the user on charging by selecting charging modes based on different operating modes.

To better understand the technology disclosed herein, embodiments will be described in detail with reference to the attached drawings.

According to an embodiment of the present disclosure, there is provided a charging method for an electronic device having a plurality of operating modes. The electronic device may include at least two energy storage units. For example, each of the energy storage units may comprise a battery for storing electric energy, such as a lithium ion battery and a hydrogen battery. As shown in FIG. 1, the method may comprise operation S101 of detecting an operating mode of the electronic device; operation S102 of utilizing a first charging mode corresponding to a first operating mode to charge the electronic device when the first operating mode is detected; and operation S103 of utilizing a second charging mode corresponding to a second operating mode to charge the electronic device when the second operating mode is detected.

For example, the electronic device may comprise an electronic device including components which can be assembled with each other and/or detached from each other flexibly, e.g., a notebook computer which be divided into a tablet computer and a base, a notebook constituted of a smart mobile phone and a docking station with a display screen. The electronic device may operate in different operating modes. For example, when the tablet computer and the base are combined in such a manner that a display side of the tablet computer faces a keyboard on the base, they operate as a conventional notebook computer; and when they are combined in such a manner that the display side of the tablet computer faces away from the keyboard on the base, they operate as a tablet computer with a support structure; and when they are combined in such a manner that the tablet computer and the base stand up with their back sides against each other, they operate in a tent mode usually used for presentation and camping. For another example, when the smart mobile phone stands up on the docking station with the display screen, they are combined as a notebook computer; and when the smart mobile phone is laid down onto the docking station, the docking station is used to charge the mobile phone, and so on. The present disclosure is not limited thereto.

In actual situations, detecting the operating mode of the electronic device may be implemented in various manners, e.g., by detecting a connection mode of the electronic device, a power consumption of components included in the electronic device, a change in charge amount of a battery of the electronic device, and/or environmental parameters of the electronic device. For example, when the smart mobile phone is charged by the docking station, the docking station may have its power consumption within a predefined range. Thus, when it is detected that the power consumption of the docking station is within such a range, it may be determined that the docking station is in an operation mode for charging the mobile phone. When the docking station and the smart mobile phone are combined into one notebook computer, the power consumption of the docking station will fall within another range which is apparently different from the above mentioned predefined range. Such another range may indicate that the docking station is in an operation mode in which the docking station functions as a base of the notebook computer. For another example, an extension lens with a charging function for a digital camera may be determined as being used as the extension lens based on luminous flux passing therethrough.

According to the above embodiments of the present disclosure, the operation mode of the electronic device is detected in real time to adjust the charging mode based on the operation mode. As a result, it is possible to perform charging according to actual requirements of the user on charging. Of course, a plurality of operation modes and charging modes may be provided to be selected by the user to further satisfy the user's requirements.

Figure 2:
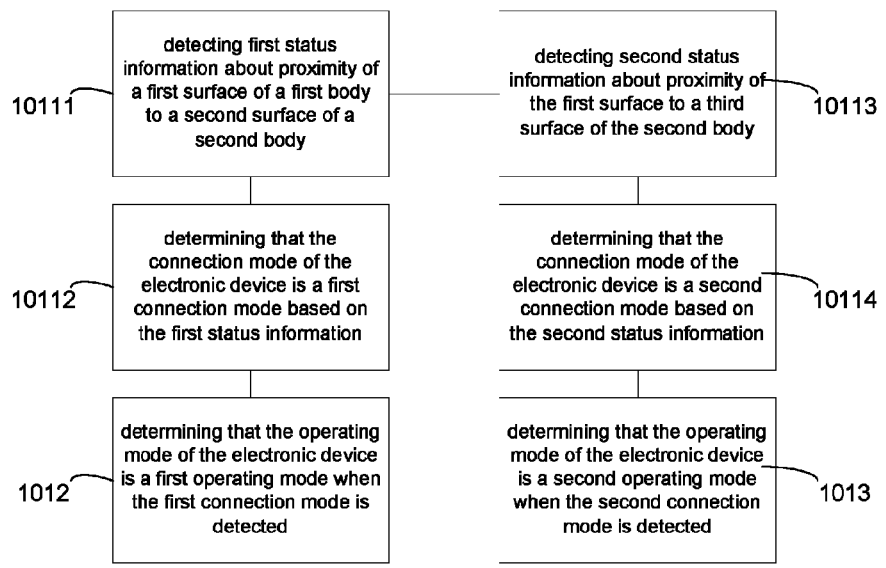
FIG. 2 is a flowchart schematically showing a method of detecting an operating mode according to an embodiment of the present disclosure.

As shown FIG. 2, an example where the operation modes are determined according to connection modes of the electronic device is described in detail. In the charging method according to the embodiment of the present disclosure, detecting the operating mode of the electronic device may comprise: operation S1011 of detecting a connection mode of the electronic device; operation S1012 of determining that the operating mode of the electronic device is a first operating mode when the first connection mode is detected; and operation S1023 of determining that the operating mode of the electronic device is a second operating mode when the second connection mode is detected.

In actual situations, the connection mode of the electronic device may be determined in various manners. For example, a sensing unit (e.g. a pressure sensor) may be provided at a connection portion and the sensing unit may output different signals corresponding to different connection modes to indicate the different connection modes, so as to implement the detection of the connection modes. For another example, a detection circuit may be provided at the connection portion to output different status bits corresponding to different connection modes to indicate the different connection modes, so as to implement the detection of the connection modes. The present disclosure is not limited thereto.

Hereinafter, an example where the connection modes are detected according to different positions of facing surfaces relative to each other will be described in detail. In the charging method according to the embodiment of the present disclosure, for example, the electronic device may comprise a first body and a second body, and detecting the connection mode of the electronic device may comprise: operation S10111 of detecting first status information about proximity of a first surface of the first body to a second surface of the second body; operation S10112 of determining that the operating mode of the electronic device is the first connection mode based on the first status information; operation S10113 of detecting second status information about proximity of the first surface to a third surface of the second body; and operation S10114 of determining that the operating mode of the electronic device is the second connection mode based on the second status information.

Figure 11:
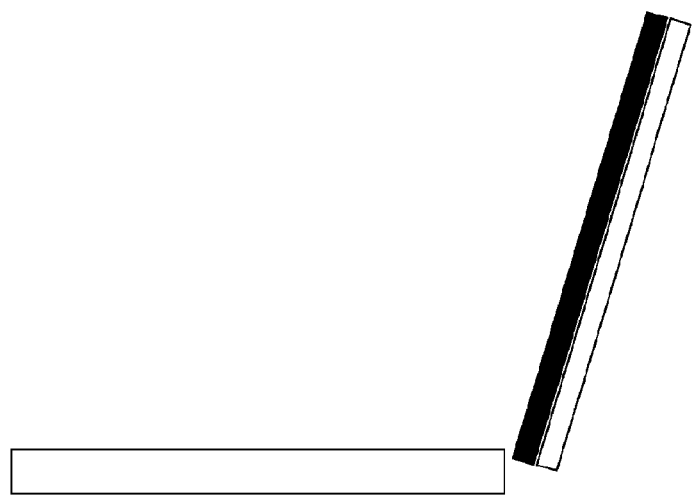
FIG. 11 is a schematic view showing a notebook mode.
Figure 12:
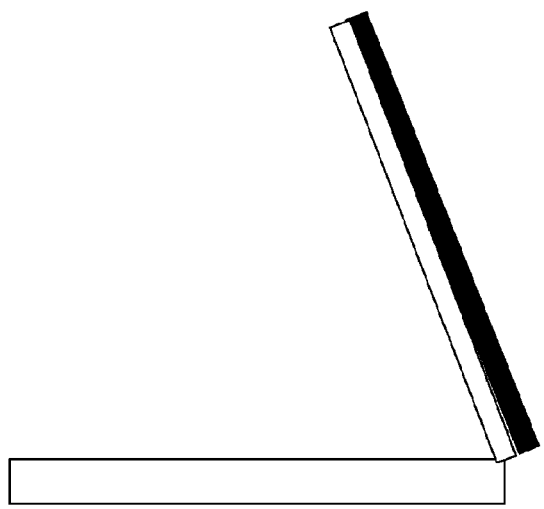
FIG. 12 is a schematic view showing a tablet mode.

In actual situations, particular corresponding relationships between the positions of the facing surfaces of the electronic device relative to each other and the connection/operation modes may be set according to conditions of the electronic device. For example, the first surface may comprise a surface of the keyboard on the base, the second surface may comprise a surface of the display screen of the tablet computer, and the third surface may comprise a back surface of the display screen of the tablet computer. When the tablet computer and the base are combined in such a manner that the display side of the tablet computer faces the keyboard on the base, they operate as a conventional notebook computer, which may be defined as a NOTEBOOK mode, as shown in FIG. 11. When they are combined in such a manner that the display side of the tablet computer faces away from the keyboard on the base, they operate as a tablet computer with a support structure, which may be defined as a TABLET mode, as shown in FIG. 12. The present disclosure is not limited thereto.

According to embodiments of the present disclosure, in addition to the positions of the facing surfaces of the electronic device relative to each other, positions of corresponding sides relative to each other and/or positions of corresponding points relative to each other may be used to determine the connection modes of the electronic device.

After the operation mode is determined, the electronic device may be charged in the charging mode corresponding to the operation mode. The charging modes may be particularly set according to particular use scenes of the operation modes and the user's corresponding requirements. Alternatively, various options may be provided to enable the user himself to edit the charging modes. For example, the charging modes may comprise one where the two energy storage units are charged simultaneously at the same rate (power), one where the order for charging is determined based on priorities, one where the two energy storage units are charged simultaneously but at different rates (power), one where the two energy storage units are charged alternately based on a clock, one where the charging rate (power) is changed with the charge amount of the battery, or one where two or more of the above are combined. The present disclosure is not limited thereto.

Figure 3:
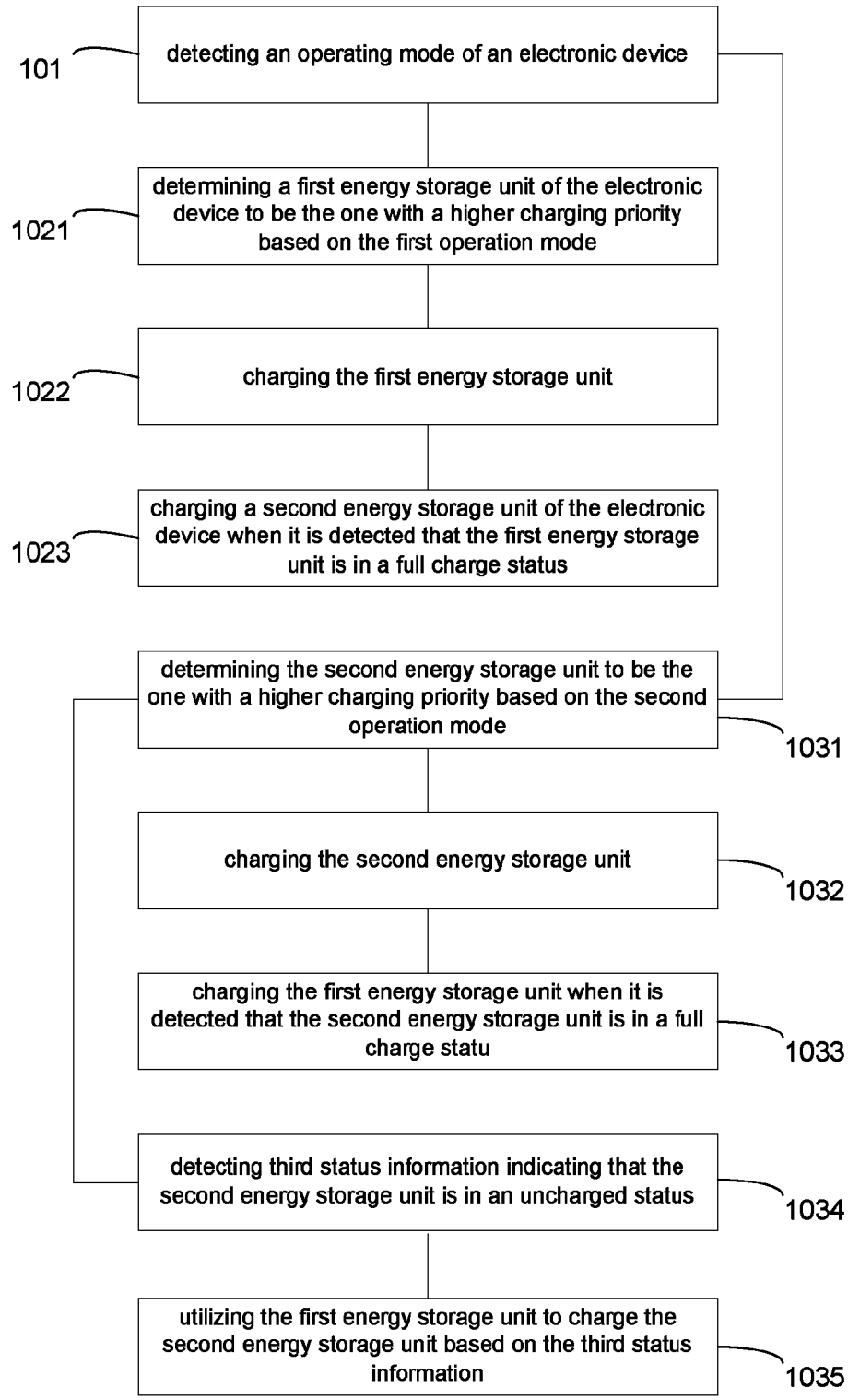
FIG. 3 is a flowchart schematically showing another charging method according to an embodiment of the present disclosure.

As shown in FIG. 3, an exemplary charging strategy where the order for charging is determined based on priorities is described in detail. In the charging method according to the embodiment of the present disclosure, the operation of utilizing the first charging mode corresponding to the first connection mode to charge the electronic device may comprise: operation S1021 of determining a first energy storage unit of the two energy storage units to be the one with a higher charging priority based on the first operation mode; operation S1022 of charging the first energy storage unit; and operation S1023 of charging a second energy storage unit of the two energy storage units when it is detected that the first energy storage unit is in a full charge status.

Taking the notebook computer which may be divided into the tablet computer and the base as an example, when the display side of the tablet computer faces the keyboard on the base, it is determined that the notebook computer is in the NOTEBOOK mode. In this case, the charging mode may be set to first charge the battery in the base so as to ensure that document editing operations being carried out by the user or a large scale console game played by the user may run stably. When the battery in the base reaches a charge saturation status, the battery in the tablet computer is then charged.

Furthermore, the operation of utilizing the second charging mode corresponding to the second operating mode to charge the electronic device may comprise: operation S1031 of determining a second energy storage unit of the two energy storage units to be the one with a higher charging priority based on the second operation mode; operation S1032 of charging the second energy storage unit; and operation S1033 of charging a first energy storage unit of the two energy storage units when it is detected that the second energy storage unit is in a full charge status.

Still taking the notebook computer which may divided into the tablet computer and the base as an example, when the display side of the tablet computer faces away from the keyboard on the base, it is determined that the notebook computer is in the TABLET mode. In this case, the charging mode may be set to first charge the battery in the tablet computer so as to maintain the battery of the tablet computer in a charge saturation state. As a result, the tablet computer is ready to be taken out by the user for separate use.

Furthermore, after determining that the second energy storage unit of the two energy storage units is the one with a higher charging priority, the method may further comprise: operation S1034 of detecting third status information indicating that the second energy storage unit is in an uncharged status; and operation S1035 of utilizing the first energy storage unit to charge the second energy storage unit based on the third status information.

Still taking the notebook computer which may be divided into the tablet computer and the base as an example, when the display side of the tablet computer faces away from the keyboard on the base, it is determined that the notebook computer is in the TABLET mode and the charging mode may be further optimized. For example, when it is detected that the tablet computer is not charged through a corresponding power adapter, the tablet computer can be charged by the battery in the base so as to keep the charge amount of the battery in the tablet computer as much as possible, so that it is ready to be taken out by the user for separate use.

Figure 4:
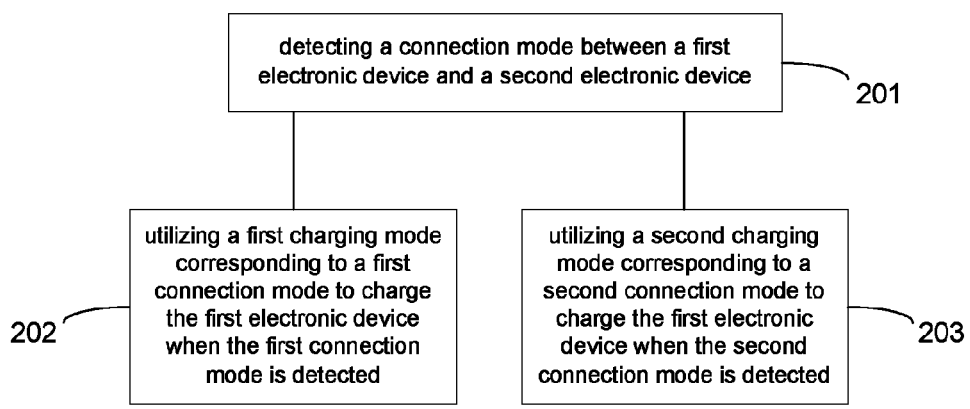
FIG. 4 is a flowchart schematically showing a charging method according to another embodiment of the present disclosure.

According to another aspect of the present disclosure, there is provided a charging method for a first electronic device connectable to a second electronic device in at least two connection modes. As shown in FIG. 4, the method may comprise: operation S201 of detecting a connection mode between the first electronic device and the second electronic device; operation S202 of utilizing a first charging mode corresponding to a first connection mode to charge the first electronic device when the first connection mode is detected; operation S203 of utilizing a second charging mode corresponding to a second connection mode to charge the first electronic device when the second connection mode is detected.

For example, the first electronic device and the second electronic device may comprise any components included in an electronic device which can be assembled with each other and/or detached from each other flexibly, e.g. a tablet computer and a base included in a detachable notebook computer, a smart mobile phone and a docking station with a display screen which can charge the mobile phone and/or constitute together with the smart mobile phone a notebook computer. The electronic devices may be connected in different connection modes. For example, when the tablet computer and the base are connected in such a manner that a display side of the tablet computer faces a keyboard on the base, they are combined as a conventional notebook computer; and when they are connected in such a manner that the display side of the tablet computer faces away from the keyboard on the base, they are combined as a tablet computer with a support structure; and when they are connected in such a manner that the tablet computer and the base stand up with their back sides against each other, they are combined in a tent mode usually used for presentation and camping. For another example, when the smart mobile phone is connected to the docking station with the display screen with its screen facing the docking station, they are combined as a notebook computer; and when the smart mobile phone is connected to the docking station with the display screen with its screen facing away from the docking station, the docking station is used to charge the mobile phone, and so on. The present disclosure is not limited thereto.

In actual situations, the connection mode of the electronic devices may be determined in various manners. For example, a sensing unit (e.g. a pressure sensor) may be provided at a connection portion and the sensing unit may output different signals corresponding to different connection modes to indicate the different connection modes, so as to implement the detection of the connection modes. For another example, a detection circuit may be provided at the connection portion to output different status bits corresponding to different connection modes to indicate the different connection modes, so as to implement the detection of the connection modes. The present disclosure is not limited thereto.

Hereinafter, an example where the connection modes are detected according to different positions of facing surfaces relative to each other when the first electronic device is connected to the second electronic device will be described in detail. In the charging method according the embodiment of the present disclosure, detecting the connection mode of the electronic devices may comprise: operation S2011 of detecting first status information about proximity of a first surface of the first electronic device to a second surface of the second electronic device; operation S2012 of determining that the connection mode between the first electronic device and the second electronic device is the first connection mode based on the first status information; operation S2013 of detecting second status information about proximity of the first surface of the first electronic device to a third surface of the second electronic device; and operation S2014 of determining that the connection mode between the first electronic device and the second electronic device is the second connection mode based on the second status information.

In actual situations, particular corresponding relationships between the positions of the facing surfaces of the electronic devices relative to each other and the connection/operation modes may be set according to t conditions of the electronic device. For example, when the tablet computer and the base are combined in such a manner that the display side of the tablet computer faces the keyboard on the base, they are combined as a conventional notebook computer, which may be defined as a NOTEBOOK mode. When they are combined in such a manner that the display side of the tablet computer faces away from the keyboard on the base, they are combined as a tablet computer with a support structure, which may be defined as a TABLET mode.

After the operation mode is determined, the electronic device may be charged in the charging mode corresponding to the operation mode. The charging modes may be particularly set according to particular use scenes of the operation modes and the user's corresponding requirements. Alternatively, various options may be provided to enable the user himself to edit the charging modes. For example, the charging modes may comprise one where the two energy storage units are charged simultaneously at the same rate (charging power), one where the order for charging is determined based on priorities, one where the two energy storage units are charged simultaneously but at different rates (charging power), one where the two energy storage units are charged alternately based on a clock, one where the charging rate (charging power) is changed with the charge amount of the battery, or one where two or more of the above are combined. The present disclosure is not limited thereto.

Figure 5:
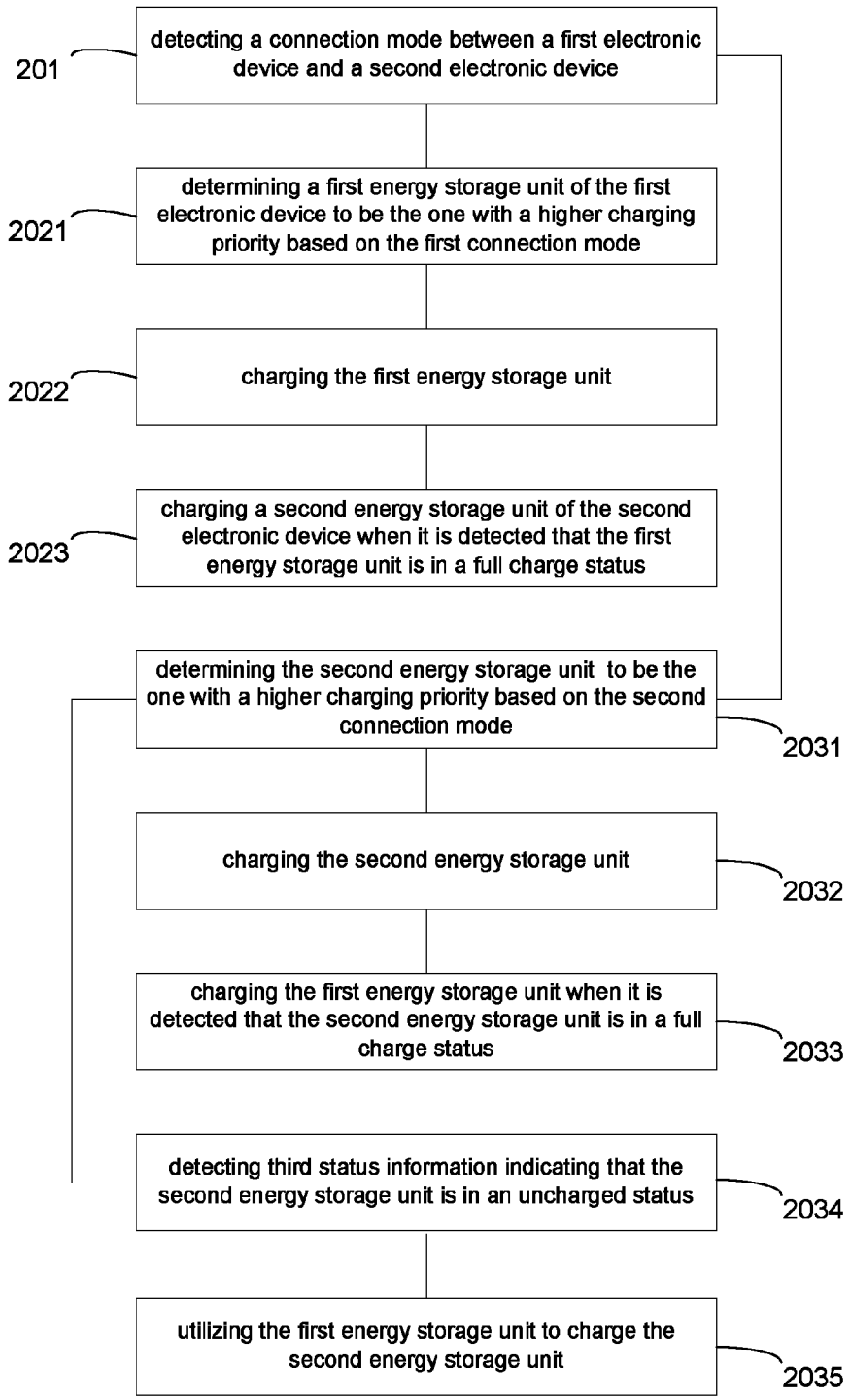
FIG. 5 is a flowchart schematically showing another charging method according to another embodiment of the present disclosure.

As shown in FIG. 5, an exemplary charging strategy where the order for charging is determined based on priorities is described in detail. In the charging method according to the embodiment of the present disclosure, the operation of utilizing the first charging mode corresponding to the first connection mode to charge the first electronic device may comprise: operation of S2021 of determining a first energy storage unit of the first electronic device to be the one with a higher charging priority based on the first connection mode; operation S2022 of charging the first energy storage unit; and operation S2023 of charging a second energy storage unit of the second electronic device when it is detected that the first energy storage unit is in a full charge status.

Taking the tablet computer and the base which can be combined into the notebook computer as an example, when the display side of the tablet computer faces the keyboard on the base, it is determined that it is in the NOTEBOOK mode. In this case, the charging mode may be set to first charge the battery in the base so as to ensure that document editing operations being carried out by the user or a large scale console game played by the user may run stably. When the battery in the base reaches a charge saturation status, the battery in the tablet computer is then charged.

Furthermore, the operation of utilizing the second charging mode corresponding to the second connection mode to charge the first electronic device may comprise: operation S2031 of determining a second energy storage unit of the second electronic device to be the one with a higher charging priority based on the second connection mode; operation S2032 of charging the second energy storage unit; and operation S2033 of charging a first energy storage unit of the first electronic device when it is detected that the second energy storage unit is in a full charge status.

Still taking the tablet computer and the base which can be combined into the notebook computer as an example, when the display side of the tablet computer faces away from the keyboard on the base, it is determined that it is in the TABLET mode. In this case, the charging mode may be set to first charge the battery in the tablet computer so as to maintain the battery of the tablet computer in a charge saturation state. As a result, the tablet computer is ready to be taken out by the user for separate use.

Furthermore, after determining that the second energy storage unit of the second electronic device is the one with a higher charging priority, the method may further comprise: operation S2034 of detecting third status information indicating that the second energy storage unit is in an uncharged status; and operation S2035 of utilizing the first energy storage unit to charge the second energy storage unit.

Still taking the tablet computer and the base which can be combined into the notebook computer as an example, when the display side of the tablet computer faces away from the keyboard on the base, it is determined that it is in the TABLET mode and the charging mode may be further optimized. For example, when it is detected that the tablet computer is not charged through a corresponding power adapter, the tablet computer can be charged by the battery in the base so as to keep the charge amount of the battery in the tablet computer as much as possible, so that it is ready to be taken out by the user for separate use.

In particular applications, in addition to the positions of the facing surfaces of the electronic devices relative to each other, positions of corresponding sides relative to each other and/or positions of corresponding points relative to each other may be used to determine the connection modes of the electronic device.

In actual situations, if the first electronic device is not connected to the second electronic device, the first electronic device, when being charged, will have its battery directly charged. As for the charging rate (power), it may be identical to or different from (e.g., smaller than or greater than) that of the first charging mode or the second charging mode as described above. The present disclosure is not limited thereto.

Figure 6:
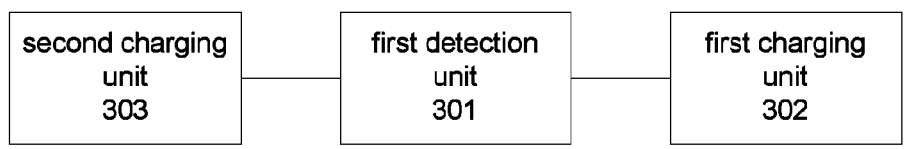
FIG. 6 is a schematic view showing a configuration of an electronic device according to still another embodiment of the present disclosure.

According to a further aspect of the present disclosure, there is provided an electronic device having a plurality of operating modes and including at least two energy storage units. As shown in FIG. 6, the electronic device may comprise: a first detection unit 301 configured to detect an operating mode of the electronic device; a first charging unit 302 configured to utilize, based on a detected first operating mode, a first charging mode corresponding to the first operating mode to charge the electronic device; and a second charging unit 303 configured to utilize, based on a detected second operating mode, a second charging mode corresponding to the second operating mode to charge the electronic device.

Figure 7:
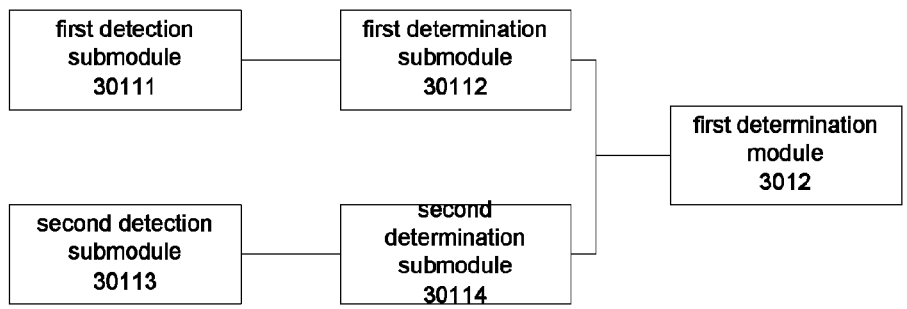
FIG. 7 is a schematic view showing a configuration of a first detection unit according to still another embodiment of the present disclosure.

An example where the operation modes are determined according to connection modes of the electronic device is described in detail. In the electronic device according the embodiment of the present disclosure, as shown in FIG. 7, the first detection unit 301 may comprise: a first detection module 3011 configured to detect a connection mode of the electronic device; and a first determination module 3012 configured to determine the operating mode of the electronic device based on the detected connection mode, wherein is the first determination module 3012 is configured to determine that the operating mode of the electronic device is the first operating mode when the detected connection mode is a first connection mode, and to determined that the operating mode of the electronic device is the second operating mode when the detected connection mode is a second connection mode.

Hereinafter, an example where the connection modes are detected according to different positions of facing surfaces relative to each other will be described in detail. The electronic device according to the embodiment of the present disclosure may comprise a first body and a second body. The first detection module 3011 may comprise: a first detection submodule 30111 configured to detect first status information about proximity of a first surface of the first body to a second surface of the second body; a first determination submodule 30112 configured to determine that the connection mode of the electronic device is the first connection mode based on the first status information; a second detection submodule 30113 configured to detect second status information about proximity of the first surface to a third surface of the second body; and a second determination submodule 30114 configured to determine that the connection mode of the electronic device is the second connection mode based on the second status information.

Figure 8:
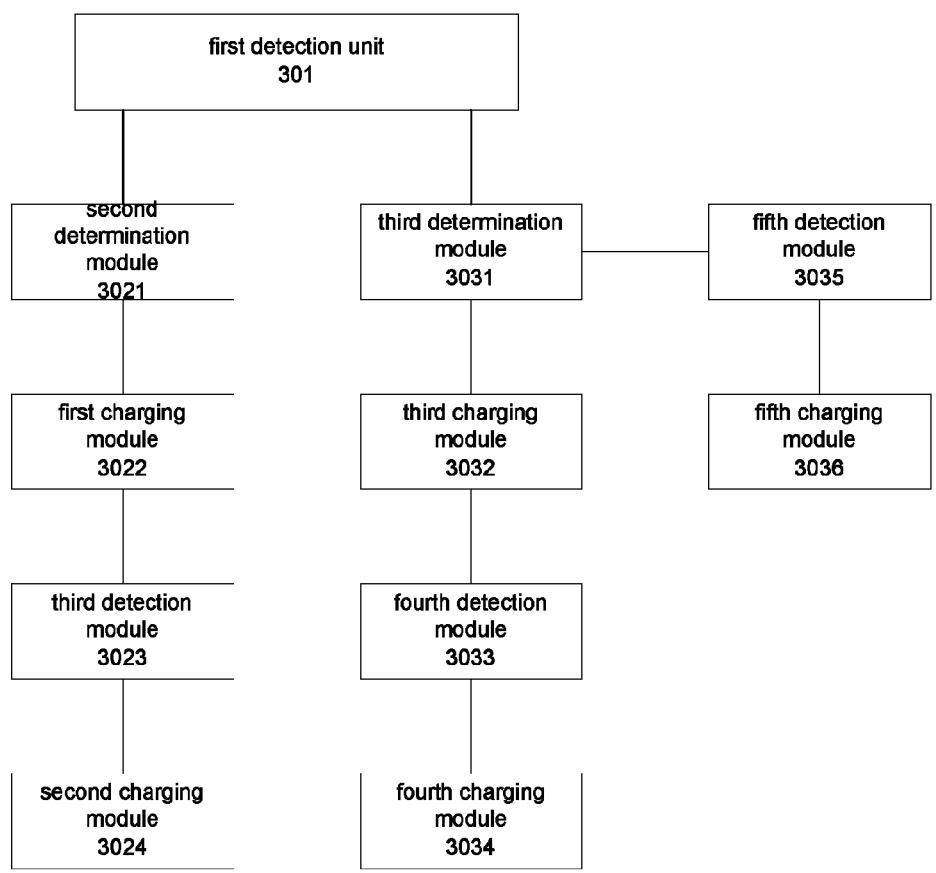
FIG. 8 is a schematic view showing a configuration of another electronic device according to still another embodiment of the present disclosure.

As shown in FIG. 8, an exemplary charging strategy where the order for charging is determined based on priorities is described in detail. In the electronic device according to the embodiment of the present disclosure, the first charging unit 302 may comprise: a second determination module 3021 configured to determine a first energy storage unit of the two energy storage units to be the one with a higher charging priority based on the first operating mode; a first charging module 3022 configured to charge the first energy storage unit when first energy storage unit is determined to be the one with a higher charging priority; a third detection module 3023 configured to detect first charge information indicating that the first energy storage unit is in a full charge status; and a second charging module 3024 configured to charge a second energy storage unit of the two energy storage units based on the first charge information.

Further, the second charging unit 303 may comprise: a third determination module 3031 configured to determine a second energy storage unit of the two energy storage units to be the one with a higher charging priority based on the second operating mode; a third charging module 3032 configured to charge the second energy storage unit when the second energy storage unit is determined to be the one with a higher charging priority; a fourth detection module 3033 configured to detect second charge information indicating that the second energy storage unit is in a full charge status; and a fourth charging module 3034 configured to charge a first energy storage unit of the two energy storage units based on the second charge information.

Further, in order to ensure the charge amount of the second energy storage unit as much as possible after it is determined that the second energy storage unit of the two energy storage units is the one with a higher charging priority, the second charging unit 303 may comprise: a fifth detection module 3035 configured to detect third status information indicating that the second energy storage unit is in an uncharged status when the second energy storage unit is determined to be the one with a higher charging priority; and a fifth charging module 3036 configured to charge the second energy storage unit by using the first energy storage unit based on the third status information.

The various charging strategies and particular implementations described in the above embodiments of the charging methods are also applicable to the electronic device here. It is apparent for those skilled that there are various implementations of the electronic device, detailed descriptions of which are omitted here for clarity.

Figure 9:
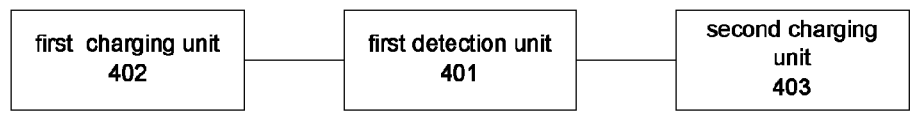
FIG. 9 is a schematic view showing a configuration of an electronic device according to still another embodiment of the present disclosure.

According to a still further aspect of the present disclosure, there is provided an electronic device connectable to a second electronic device in at least two connection modes. As shown in FIG. 9, the electronic device may comprise: a first detection unit 401 configured to detect a connection mode between the electronic device and the second electronic device; a first charging unit 402 configured to utilize, based on a detected first operating mode, a first charging mode corresponding to the first connection mode to charge the electronic device; and a second charging unit 403 configured to utilize, based on a detected second operating mode, a second charging mode corresponding to the second connection mode to charge the electronic device.

Hereinafter, an example where the connection modes are detected according to different positions of facing surfaces relative to each other when the electronic device is connected to the second electronic device will be described in detail. In the electronic device according to the embodiment of the present disclosure, the first detection unit 401 may comprise: a first detection module 4011 configured to detect first status information about proximity of a first surface of the electronic device to a second surface of the second electronic device; a first determination module 4012 configured to determine that the connection mode between the electronic device and the second electronic device is the first connection mode based on the first status information; a second detection module 4013 configured to detect second status information about proximity of the first surface of the electronic device to a third surface of the second electronic device; and a second determination module 4014 configured to determine that the connection mode between the electronic device and the second electronic device is the second connection mode based on the second status information.

Figure 10:
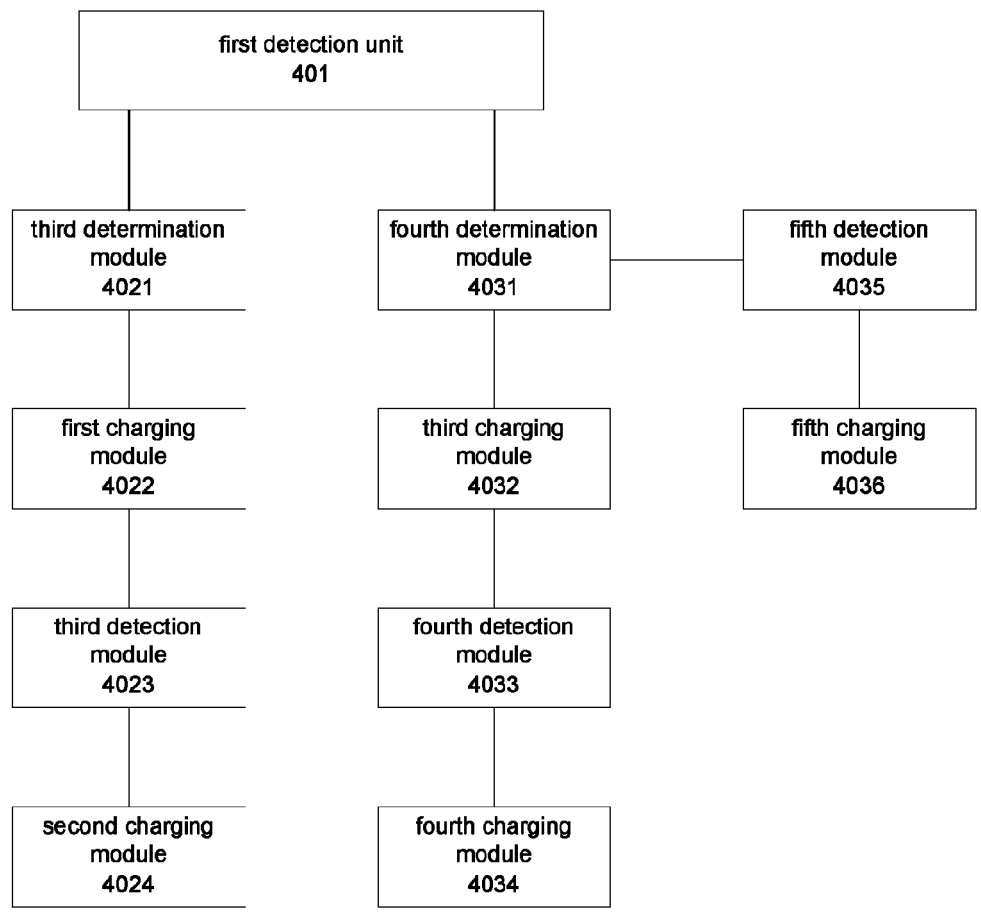
FIG. 10 is a schematic view showing a configuration of another electronic device according to still another embodiment of the present disclosure.

As shown in FIG. 10, an exemplary charging strategy where the order for charging is determined based on priorities is described in detail. In the electronic device according to the embodiment of the present disclosure, the first charging unit 402 may comprise: a third determination module 4021 configured to determine a first energy storage unit of the electronic device to be the one with a higher charging priority based on the first connection mode; a first charging module 4022 configured to charge the first energy storage unit when the first energy storage unit is determined to be the one with a higher charging priority; a third detection module 4023 configured to detect first charge information indicating that the first energy storage unit is in a full charge status; and a second charging module 4024 configured to charge a second energy storage unit of the second electronic device based on the first charge information.

Further, the second charging unit 403 may comprise: a fourth determination module 4031 configured to determine a second energy storage unit of the second electronic device to be the one with a higher charging priority based on the second connection mode; a third charging module 4032 configured to charge the second energy storage unit when the second energy storage unit is determined to be the one with a higher charging priority; a fourth detection module 4033 configured to detect second charge information indicating that the second energy storage unit is in a full charge status; and a fourth charging module 4044 configured to charge a first energy storage unit of the electronic device based on the second charge information.

Further, in order to ensure the charge amount of the second energy storage unit as much as possible after it is determined that the second energy storage unit of the second electronic device is the one with a higher charging priority, the second charging unit 403 may further comprise: a fifth detection module 4035 configured to detect third status information indicating that the second energy storage unit is in an uncharged status when the second energy storage unit is determined to be the one with a higher charging priority; and a fifth charging module 4036 configured to charge the second energy storage unit by using the first energy storage unit based on the third status information.

The various charging strategies and particular implementations described in the above embodiments of the charging methods are also applicable to the electronic device here. It is apparent for those skilled that there are various implementations of the electronic device, detailed descriptions of which are omitted here for clarity.

According to one or more embodiments of the present disclosure, there can be the following effects or advantages.

According to embodiments of the present disclosure, when an electronic device is to be charged, an operating mode of the electronic device is detected, and then a corresponding charging mode for the electronic device is determined according to the detected operating mode and the electronic device is charged in the charging mode. For example, assume an electronic device includes a tablet computer and a base. When the tablet computer and the base are combined in such a manner that a display side of the tablet computer faces a keyboard on the base, the electronic device is actually operated as a notebook computer, and a user may need to make inputs by using the keyboard to perform operations such as editing. Therefore, it is preferred to first charge the base so as to make the notebook computer stably operate. When the tablet computer and the base are combined in such a manner that the display side of the tablet computer faces away from the keyboard on the base, it is preferred to first charge the tablet computer so as to maintain its battery in a charge saturation state. As a result, the tablet computer is ready to be taken out by the user for separate use. Thus, it is possible to satisfy different requirements of the user on charging by selecting charging modes based on different operating modes, and thus to meet the need of automatically adapting the charging mode for the electronic device in real time to the actual operation mode of the electronic device.

According to further embodiments of the present disclosure, after the second energy storage unit of the two energy storage units is determined to be the one with a higher charging priority, whether the second energy storage unit is charged or not may be detected. When it is detected that the second energy storage unit is not charged, the first energy storage unit may be utilized to charge the second energy storage unit to ensure that the second energy storage unit is in a charge saturation status. Taking the detachable notebook as an example, when a power adapter is drawn out or turned off, it is detected that the second battery in the tablet computer is not charged and thus the second battery will be charged by the first battery in the base to ensure that the battery of the tablet computer is in a charge saturation status. As a result, when the user takes out the tablet computer for separate use, it is possible to keep the charge amount in the tablet computer as much as possible and thus to facilitate the user to use the tablet computer as long as possible.

It is apparent for those skilled in the art to make various alternatives and variations to the present disclosure without departing from the spirit and scope of the present disclosure. Thus, if these alternatives and variations fall within the scope of the claims and their equivalences, it is intended to encompass all these alternatives and variations.

I claim:

1. A charging method for a first electronic device, the method comprising:
  detecting a connection mode between the first electronic device and a second electronic device connectable to the first electronic device in at least a first connection mode and a second connection mode;
  determining which one of a first charging mode and a second charging mode will be used to charge the first electronic device based the detected connection mode; and
  charging the first electronic device by utilizing the determined one of the first charging mode and the second charging mode.

2. The charging method according to claim 1,
  wherein said determining which one of a first charging mode and a second charging mode will be used to charge the first electronic device based the detected connection mode comprises:
  determining that the first charging mode will be used to charge the first electronic device if the first connection mode was detected, and
  wherein said charging the first electronic device by utilizing the determined one of the first charging mode and the second charging mode comprises:
    determining a first energy storage unit of the first electronic device to be the one with a higher charging priority based on the first connection mode;
    charging the first energy storage unit; and
    charging a second energy storage unit of the second electronic device when it is detected that the first energy storage unit is in a full charge status.

3. The charging method according to claim 1,
  wherein said determining which one of a first charging mode and a second charging mode will be used to charge the first electronic device based the detected connection mode comprises:
    determining that the second charging mode will be used to charge the first electronic device if the second connection mode was detected, and
  wherein said charging the first electronic device by utilizing the determined one of the first charging mode and the second charging mode comprises:
    determining a second energy storage unit of the second electronic device to be the one with a higher charging priority based on the second connection mode;
    charging the second energy storage unit; and
    charging a first energy storage unit of the first electronic device when it is detected that the second energy storage unit is in a full charge status.

4. The charging method according to claim 3, wherein after determining that the second energy storage unit of the second electronic device is the one with a higher charging priority, the method further comprises:
  detecting third status information indicating that the second energy storage unit is in an uncharged status; and
  utilizing the first energy storage unit to charge the second energy storage unit based on the third status information.

5. A charging method for a first electronic device, the method comprising:
  detecting a connection mode between the first electronic device and a second electronic device connectable to the first electronic device in at least two connection modes;
  utilizing a first charging mode corresponding to a first connection mode to charge the first electronic device when the first connection mode is detected; and
  utilizing a second charging mode corresponding to a second connection mode to charge the first electronic device when the second connection mode is detected,
  wherein said detecting a connection mode between the first electronic device and the second electronic device comprises:
  detecting first status information about proximity of a first surface of the first electronic device to a second surface of the second electronic device;
  determining that the connection mode between the first electronic device and the second electronic device is the first connection mode based on the first status information;
  detecting second status information about proximity of the first surface of the first electronic device to a third surface of the second electronic device; and
  determining that the connection mode between the first electronic device and the second electronic device is the second connection mode based on the second status information.

6. An electronic device, the electronic device comprising:
  a processor configured to:
  detect a connection mode between the electronic device and a second electronic device connectable to the electronic device in at least a first connection mode and a second connection mode;
  determine which one of a first charging mode and a second charging mode will be used to charge the electronic device based the detected connection mode; and
  charge the electronic device by utilizing the determined one of the first charging mode and the second charging mode.

7. The electronic device according to claim 6, wherein the processor is further configured to:
  based on the first status information;
  detect first status information about proximity of a first surface of the electronic device to a second surface of the second electronic device;

determine that the connection mode between the electronic device and the second electronic device is the first connection mode based on the first status information;
detect second status information about proximity of the first surface of the electronic device to a third surface of the second electronic device; and
determine that the connection mode between the electronic device and the second electronic device is the second connection mode based on the second status information.

8. The electronic device according to claim 6, wherein the processor is further configured to:
determine that the first charging mode will be used to charge the electronic device if the first connection mode was detected,
determine a first energy storage unit of the electronic device to be the one with a higher charging priority based on the first connection mode;
charge the first energy storage unit; and
charge a second energy storage unit of the second electronic device when it is detected that the first energy storage unit is in a full charge status.

9. The electronic device according to claim 6, wherein processor is further configured to:
determine that the second charging mode will be used to charge the electronic device if the second connection mode was detected;
determine a second energy storage unit of the second electronic device to be the one with a higher charging priority based on the second connection mode;
charge the second energy storage unit; and
charge a first energy storage unit of the electronic device when it is detected that the second energy storage unit is in a full charge status.

10. The electronic device according to claim 9, wherein the processor is further configured to:
after determining that the second energy storage unit of the second electronic device is the one with a higher charging priority:
detect third status information indicating that the second energy storage unit is in an uncharged status; and
utilize the first energy storage unit to charge the second energy storage unit based on the third status information.

* * * * *